United States Patent
Sun et al.

(10) Patent No.: US 11,842,288 B2
(45) Date of Patent: Dec. 12, 2023

(54) PATTERN-LEVEL SENTIMENT PREDICTION

(71) Applicant: Capital One Services, LLC, McLean, VA (US)

(72) Inventors: Weiyan Sun, Carrollton, TX (US); Rohit Sarin, Dallas, TX (US); Elizabeth Claire Maue, Dallas, TX (US); Robert Edward Cezeaux, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 276 days.

(21) Appl. No.: 16/903,852

(22) Filed: Jun. 17, 2020

(65) Prior Publication Data

US 2021/0397985 A1 Dec. 23, 2021

(51) Int. Cl.
*G06N 5/04* (2006.01)
*G06N 20/00* (2019.01)

(52) U.S. Cl.
CPC ............... *G06N 5/04* (2013.01); *G06N 20/00* (2019.01)

(58) Field of Classification Search
CPC .......... G06N 20/00; G06N 5/003; G06N 5/04
See application file for complete search history.

(56) References Cited

U.S. PATENT DOCUMENTS

| | | | |
|---|---|---|---|
| 8,478,621 B1 | 7/2013 | Plummer et al. | |
| 10,185,972 B2 | 1/2019 | Churchill et al. | |
| 10,334,398 B2 | 6/2019 | DeLuca et al. | |
| 10,338,913 B2 | 7/2019 | Franchitti | |
| 2011/0295731 A1* | 12/2011 | Waldron, III | G06Q 10/0635 |
| | | | 705/35 |
| 2014/0249873 A1 | 9/2014 | Stephan et al. | |
| 2015/0127595 A1* | 5/2015 | Hawkins, II | G06N 7/005 |
| | | | 706/46 |
| 2015/0296026 A1 | 10/2015 | Smyth et al. | |
| 2016/0210656 A1 | 7/2016 | Chittilappilly et al. | |
| 2016/0210657 A1 | 7/2016 | Chittilappilly et al. | |
| 2016/0210661 A1 | 7/2016 | Chittilappilly et al. | |
| 2017/0323330 A1 | 11/2017 | Chittilappilly et al. | |
| 2017/0337588 A1 | 11/2017 | Chittilappilly et al. | |
| 2018/0240152 A1 | 8/2018 | Mookherjee et al. | |
| 2018/0247227 A1* | 8/2018 | Holtham | G06V 30/1914 |

(Continued)

*Primary Examiner* — Teshome Hailu
*Assistant Examiner* — Aubrey H Wyszynski
(74) *Attorney, Agent, or Firm* — Sterne, Kessler, Goldstein & Fox P.L.L.C.

(57) ABSTRACT

Based on the interaction data and response data, an interaction monitoring platform may determine a first known sentiment and a second known sentiment, identify a first pattern and a second pattern in the interaction data, and generate a first pattern-level sentiment and a second pattern-level sentiment based on the known sentiments and the identified patterns. A binary indicator may indicate which identified patterns are exhibited in a subset of the interaction data. The platform may train a gradient boosting model using known sentiment as a target variable and using binary indicators and pattern-level sentiments as input data. The platform may predict a sentiment corresponding to a subset of interaction data with unknown sentiment that exhibits one or more of the first pattern or the second pattern based on a binary indicator and the trained gradient boosting model.

20 Claims, 6 Drawing Sheets

(56) References Cited

U.S. PATENT DOCUMENTS

| | | |
|---|---|---|
| 2018/0315103 A1 | 11/2018 | Lakshminarayan et al. |
| 2019/0034963 A1 | 1/2019 | George et al. |
| 2019/0043115 A1* | 2/2019 | Purves ............... G06Q 30/0239 |
| 2019/0095502 A1 | 3/2019 | Beringer et al. |
| 2019/0180358 A1* | 6/2019 | Nan .................... G06K 9/6219 |
| 2020/0202272 A1 | 6/2020 | Aravamudhan et al. |
| 2020/0327444 A1* | 10/2020 | Negi .................. G06Q 30/0631 |
| 2021/0073327 A1 | 3/2021 | Brunn et al. |
| 2021/0174403 A1 | 6/2021 | Bellini et al. |

* cited by examiner

PATTERN-LEVEL SENTIMENT PREDICTION

CROSS-REFERENCE TO RELATED APPLICATIONS AND INCORPORATION BY REFERENCE

The following applications are incorporated herein by reference in their entirety: U.S. application Ser. No. 16/284,616, filed Feb. 25, 2019, and entitled "Performing an Action Based on User Interaction data".

BACKGROUND

Organizations may monitor user interactions and track user responses related to user interactions with an interactive platform. The organization may use the interactions and responses to improve services and improve user satisfaction. However, user interaction data may have a time-based component, which does not lend itself to certain types of analysis, such as gradient boosting. New methods are needed in order to allow prediction of user sentiment based on time series user interactions.

BRIEF SUMMARY

A method of predicting user sentiment from pattern-level sentiment may include identifying a first pattern and a second pattern in interaction data of an interactive platform. The first pattern may correspond to a first pattern-level sentiment, and the second pattern may correspond to a second pattern-level sentiment. The method may further include generating a first binary indicator and a second binary indicator. The first binary indicator indicates whether the first pattern and the second pattern are exhibited in a first subset of the interaction data. The second binary indicator indicates whether the first pattern and the second pattern are exhibited in a second subset of the interaction data. The method includes training a gradient boosting model using known sentiment as a target variable and using the first binary indicator, the second binary indicator, the first pattern-level sentiment, and the second pattern-level sentiment as input data. The method may include generating, using the trained gradient boosting model, a predicted sentiment corresponding to a third subset of the interaction data exhibiting one or more of the first pattern or the second pattern.

The first subset of the interaction data may correspond to a first user's interactions with the interactive platform. The second subset of the interaction data may correspond to a second user's interactions with the interactive platform. The third subset of the interaction data may correspond to a third user's interactions with the interactive platform.

The method may further include generating the first pattern-level sentiment based on a first known sentiment corresponding to a subset of the interaction data exhibiting the first pattern and generating the second pattern-level sentiment based on a second known sentiment corresponding to a subset of the interaction data exhibiting the second pattern.

The known sentiment, used as the target variable, may include the first known sentiment and the second known sentiment.

The method may further include collecting the interaction data from users of the interactive platform, and gathering response data from one or more of the users. The method may include generating the first known sentiment and the second known sentiment based on the gathered response data.

The first known sentiment and the second known sentiment may each include a binary value corresponding to a promotor sentiment or a detractor sentiment. The predicted sentiment may include a value in a range between a lower bound and an upper bound.

The generating of the first pattern-level sentiment may include generating a pattern-level sentiment based on a weighted average of known sentiments corresponding to subsets of the interaction data exhibiting the first pattern. Generating the second pattern-level sentiment may include generating a pattern-level sentiment based on a weighted average of known sentiments corresponding to subsets of interaction data exhibiting the second pattern.

In some embodiments, systems and computer program products of the disclosed embodiments may include a computer-readable device storing computer instructions for any of the methods disclosed herein or one or more processors configured to read instructions from the computer readable device to perform any of the methods disclosed herein.

BRIEF DESCRIPTION OF THE DRAWINGS/FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

An interactive platform may include a website, a mobile application, a web application, automated phone or chat system, customer service interactions with a person, a device, an interface of an application, or similar interactive environments. User interaction data 104 may be gathered and user sentiment corresponding to user interaction data 104 may be determined using user response data 106. A response may include a user survey response, a user complaint, a user rating, a user comment, and/or the like. A response monitoring device may track responses corresponding to user interaction data 104.

Users may interact with an interactive platform over time, generating a time series of interaction data 104 points. The sequence or timing of these interactions may have a relationship with or influence on the user's sentiment or satisfaction with the interactive platform. In addition, a user's sentiment may change over time depending on the sequence of interactions. The patterns of user interactions that may be present in time series interaction data 104 may capture an important dimension of user interactions, which can be used to more accurately monitor, predict, and respond appropriately to user sentiments.

Machine learning models may be used to identify relationships between interaction data 104 and user sentiment. Machine learning models may be trained to identify these relationships using input data that includes interaction data 104 and associated user sentiment collected from response data 106. User interaction data 104 corresponding to a user with unknown sentiment may then be processed by the machine learning model to predict the sentiment of the user with unknown sentiment based on the known sentiments of other users with similarities in their interaction data 104.

One machine learning model that can be applied in building predictive machine learning models is called gradient boosting. Gradient boosting is based on creating a high accuracy prediction rule by adding together and weighting relatively low accuracy rules. A low accuracy rule may be used for gradient boosting even if it performs only slightly better than random chance.

According to one non-limiting example, gradient boosting may be used to approach a binary classification problem (e.g., whether a customer is satisfied). Gradient boosting may train a model by sequentially adding decision trees. A first tree may classify a reference data set based on equally weighted data points. This decision tree result is compared to known classifications of the reference data set. In this non-limiting example, the known classifications may be based on user response data. The data points that proved difficult to classify correctly are re-weighted, and a second tree is built using the modified data. Additional tree layers are added until an acceptable performance level is reached.

Gradient boosting may be viewed as adding layers of weak rules to minimize a loss function. The loss function represents an error between a prediction of the gradient boosting model and a known result. In gradient boosting, the loss function must be differentiable. Gradient boosting is a powerful technique for building predictive models. However, gradient boosting cannot be performed directly on time series relationships. The input variable for gradient boosting can be either continuous or discrete, but in the case of predicting user sentiment, the time series data includes a list of ordered touchpoints. If gradient boosting treats the ordered touchpoints as a discrete variable, the order is lost. If the gradient boosting treats the ordered touchpoints as a continuous variable, information from touchpoint type is lost. Therefore, gradient boosting cannot be performed directly on time series data, such as user interaction data 104 generated by an interactive platform, without some loss of valuable information. The disclosed embodiments describe systems and methods for applying gradient boosting to time series data without this information loss.

Figure 1:
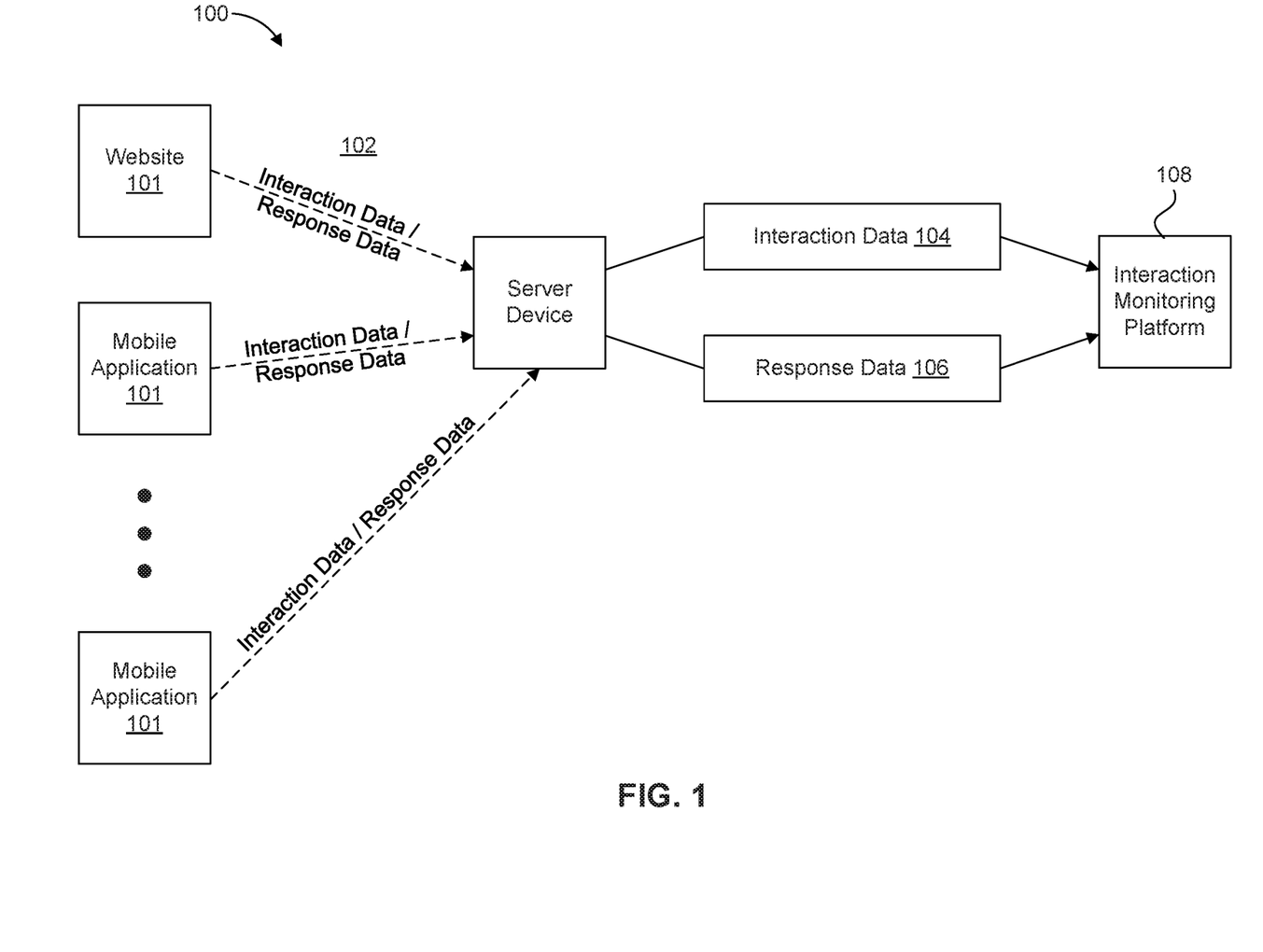
FIG. 1 is a diagram of a non-limiting example implementation of an interaction monitoring platform according to some embodiments disclosed herein.

As shown in FIG. 1, example implementations 100 may include a server device (e.g., one or more devices capable of receiving, generating, storing, processing, and/or providing information associated with user interactions) and an interaction monitoring platform 108 (e.g., a system that monitors the user interactions). Some example implementations described herein concern a single server device and/or a single interaction monitoring platform 108, but implementations can include a plurality of server devices and/or a plurality of interaction monitoring platforms 108. In some implementations, the server device and the interaction monitoring platform 108 may be connected via a network, such as the internet, an intranet, and/or the like.

As shown by reference number 102, the server device may receive interaction data 104 and/or response data 106 of the interactive platform 101. In some implementations, the server device may obtain (e.g., receive, collect, capture, and/or the like) the interaction data 104 and/or response data 106. The interaction data 104 may concern one or more user interactions (e.g., one or more interactions between a user and the interactive platform 101). A user interaction may be a website interaction, a mobile application interaction, a transaction card terminal interaction, a payment interaction, a withdrawal interaction, a deposit interaction, a returned payment interaction, a bill payment interaction, a customer service interaction, a virtual assistant interaction (e.g., via a chatbot or an interactive voice response (IVR) device), a point of sale interaction, a financial product interaction, a financial product application interaction, a financial account interaction, and/or the like. A user interaction may comprise one or more touchpoints (e.g., one or more pieces of information) concerning the user interaction. For example, a touchpoint may include information regarding a time that the interaction occurred; information regarding a specific type of interaction; information concerning who initiated the user interaction (e.g., the user, a representative of an organization, a virtual assistant, and/or the like); information concerning how the user interaction was initiated (e.g., via a website, a mobile application, a transaction card terminal, and/or the like); information concerning why the user interaction was initiated (e.g., the user wanted to pay a bill that is past due, the user wanted to transfer money between financial accounts, and/or the like); information concerning what was conveyed during the user interaction (e.g., identification information concerning the user; information concerning a user account, a financial account, a financial product, a financial product application, a bill; and/or the like); information concerning how long the user interaction lasted (e.g., an amount of time between initiation of the user interaction and termination of the user interaction); information concerning a wait time associated with the user interaction (e.g., an amount of time between initiation of the user interaction and when a representative of an organization and/or virtual assistant communicated with the user); information concerning whether the user interaction is associated with an existing user interaction issue (e.g., whether the user initiated a customer service interaction to discuss a reoccurring issue with a bill, a financial account, and/or the like); information concerning whether the user indicated dissatisfaction with the user interaction (e.g., whether the user requested to talk to a customer service representative, whether the user indicated that the user needed help during the user interaction, and/or the like); information concerning whether a corrective action was taken to address the user's dissatisfaction with the user interaction (e.g., whether a virtual assistant call was routed to a customer service representative, whether a customer service representative called the user after the user interaction, whether the user was offered a monetary credit, a discount, and/or the like); and/or the like.

When interacting with an interactive platform 101, a user may generate a sequence of many user interactions that occur over time. The interaction data 104 may include the interactions of one user or the interactions of multiple users. Each user's interactions may form a subset of the interaction data 104.

The response data 106 may include one or more user responses concerning the one or more user interactions included in the interaction data 104. A response may include a user survey response, a user complaint, a user rating, a user comment, and/or the like. In some implementations, a user response, of the one or more user responses, may correspond to a user interaction of the one or more user interactions. For example, a user response may be a survey response that corresponds to a financial product application interaction (e.g., a survey response regarding a user's experience applying for a financial product). In some implementations, a response may include information that indicates a user's sentiment regarding the user interaction (e.g., whether the user was happy with the user interaction, whether the user was unhappy with the user interaction, whether the user was satisfied with the user interaction, whether the user was unsatisfied with the user interaction, and/or the like). In some implementations, the response may include information that indicates whether a corrective action changed the user's sentiment regarding the user interaction (e.g., whether routing a call from a virtual assistant to a customer service representative changed the user's opinion of the user interaction, whether an offer of a monetary credit, a discount, and/or the like, changed the user's opinion of the user interaction, and/or the like).

As shown by reference number 104, the server device may collect interaction data 104 for a historical period of time or in real time (e.g., capture and store interaction data 104 from a particular period of time in the past or interaction data 104 currently being generated by one or more users). In some implementations, the interaction data 104 may concern a plurality of user interactions for the historical period of time. In some implementations, the interaction data 104 may concern a plurality of users, where each user, of the plurality of users, is associated with a subset of user interactions, of the plurality of user interactions. In some implementations, the server device may send the interaction data 104 to the interaction monitoring platform 108 (e.g., transmit the interaction data 104 to the interaction monitoring platform 108 via the network). In some implementations, the interaction monitoring platform 108 may obtain the interaction data 104 from the server device via the network.

As shown by reference number 106, the server device may collect response data 106 for the historical period of time or in real time (e.g., capture and store response data 106 from a particular period of time that corresponds with the interaction data 104 or response data 106 currently being generated by one or more users). In some implementations, the response data 106 may correspond to the interaction data 104 (e.g., a user response, of the one or more user responses, of the response data 106 corresponds to a user interaction, of the one or more user interactions, of the interaction data 104). In some implementations, the server device may send the response data 106 to the interaction monitoring platform 108 (e.g., transmit the response data 106 to the interaction monitoring platform 108 via the network). In some implementations, the interaction monitoring platform 108 may obtain the response data 106 from the server device via the network.

The interaction monitoring platform 108 may use response data 106 to determine a user sentiment. User sentiment may correspond to the user's interaction data 104 as a whole, or particular interactions in the user's interaction data 104. User sentiment may also be tracked and updated in response to various interactions of the user with the interactive platform 101. User sentiment may be a scalar value or a binary value indicating that the user is a promoter or a detractor. The particulars of determining or representing user sentiment from response data 106 do not interfere with the application of gradient boosting in the disclosed embodiments and a skilled person would understand that any method of determining or representing user sentiment may be used with the disclosed embodiments.

The interaction monitoring platform 108 may use historical interaction data 104 and corresponding response data 106 to train a machine learning model to be used for predicting user sentiment for users without response data 106. The machine learning model may also be used to determine user sentiment in real time as users interact with the interactive platform 101.

Figure 2:
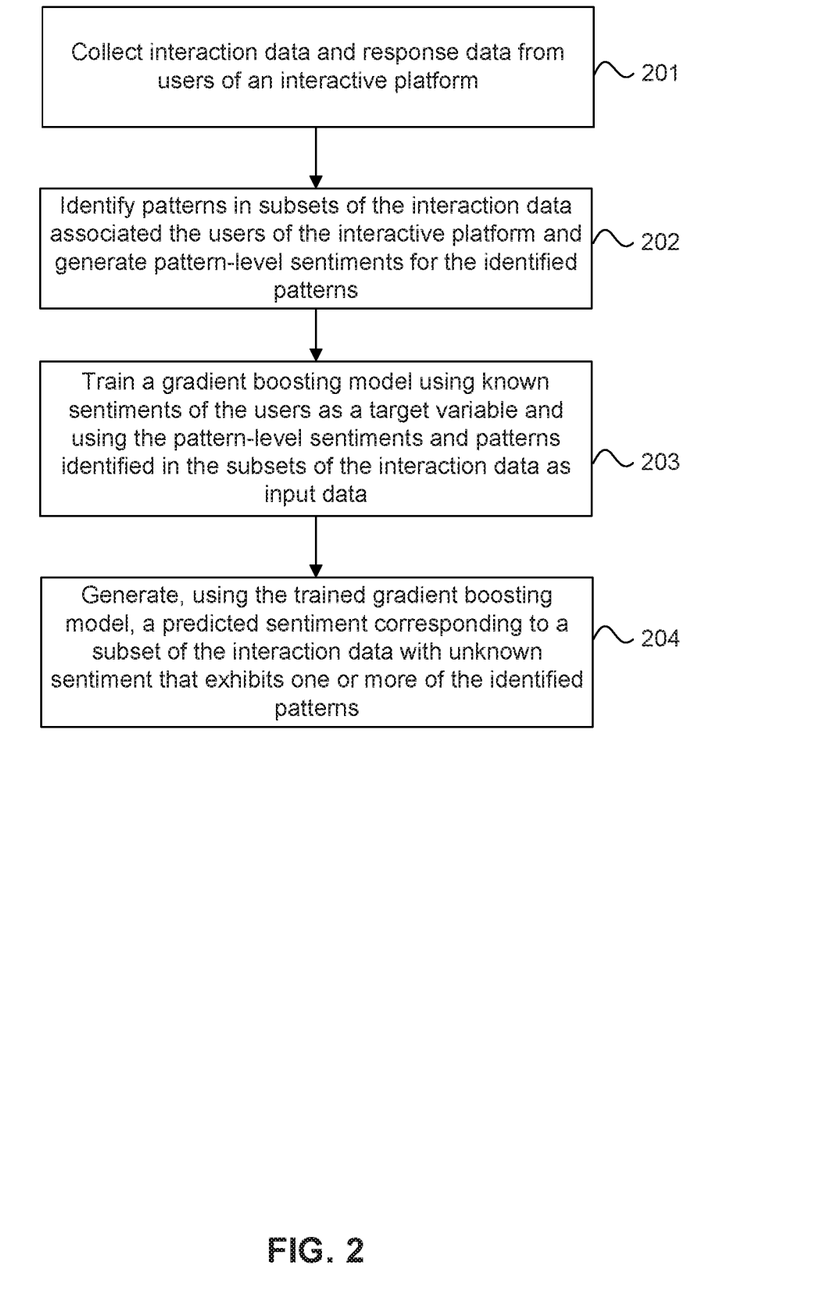
FIG. 2 is a flow chart illustrating a method of predicting user sentiment based on known sentiments, identified patterns, pattern-level sentiment and a gradient boosting model according to some embodiments disclosed herein.

FIG. 2 is a flow chart illustrating a method of predicting user sentiment based on known sentiments, identified patterns, pattern-level sentiment and a gradient boosting model according to some embodiments disclosed herein. In the description of FIG. 2, references are also made to FIG. 3.

At step 201, the interaction monitoring platform 108 may collect interaction data 104 and response data 106 from users of an interactive platform 101. The interaction data 104 may include one or more subsets of interaction data 104, and each subset may be associated with a different user of the interactive platform 101.

Figure 3:
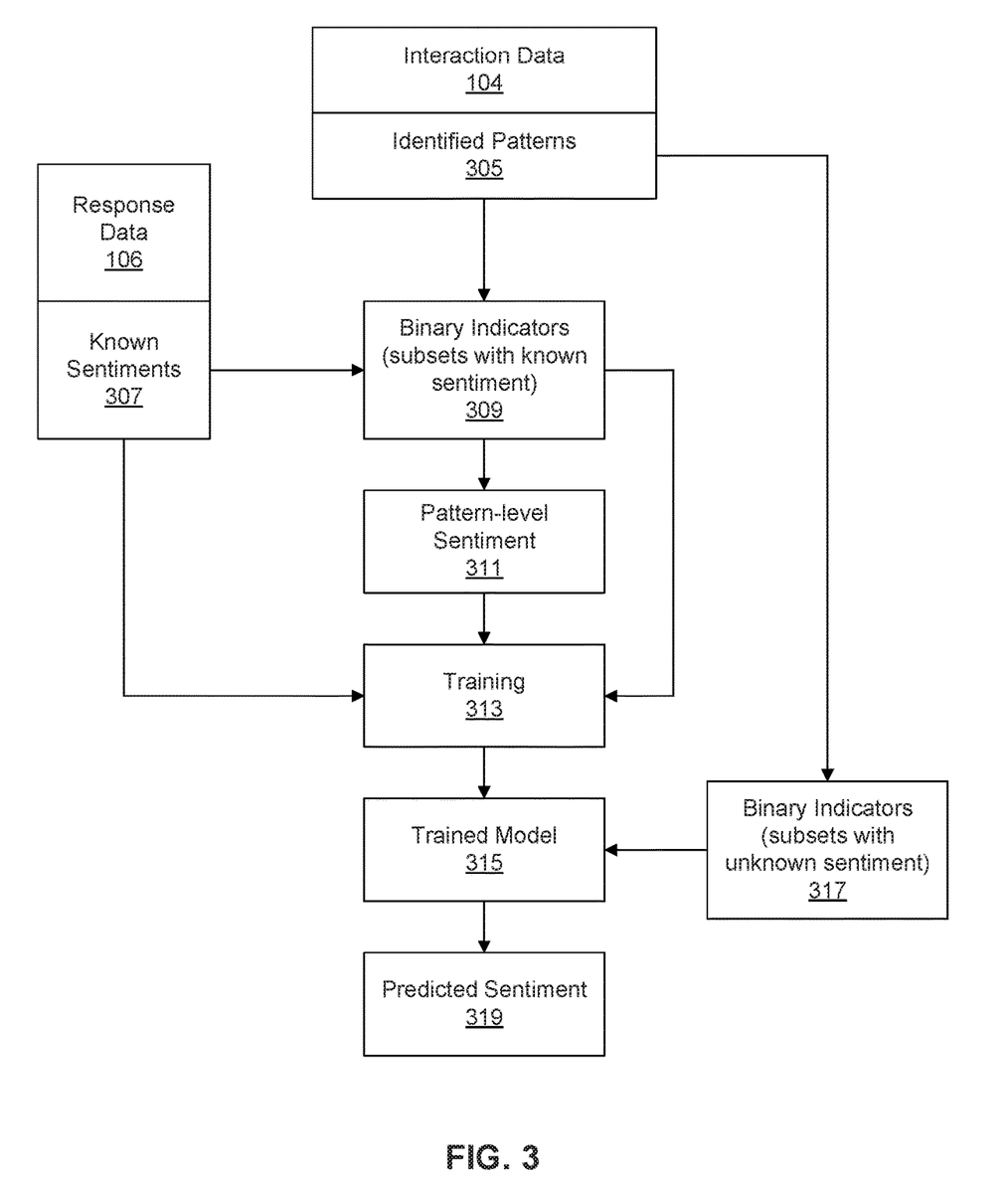
FIG. 3 is a flow chart illustrating how an interaction monitoring platform may predict a user sentiment based on a pattern-level sentiment according to some embodiments disclosed herein.

The interaction monitoring platform 108 may gather response data 106 from one or more of the users, not necessarily all users, of the interactive platform 101. The response data 106 may include users' known sentiments 307. According to some embodiments, the response data 106 may be used to generate known sentiments 307. Each known sentiment 307 may correspond to a subset of the interaction data 104 associated with a user of the interactive platform 101.

The interaction monitoring platform 108 may generate a first known sentiment and a second known sentiment based on the response data 106. The first known sentiment may correspond to a first subset of the interaction data 104 associated with a first user of the interactive platform 101. The second known sentiment may correspond to a second subset of the interaction data 104 associated with a second user of the interactive platform 101.

At step 202, the interaction monitoring platform 108 may identify patterns in subsets of the interaction data 104 associated the users of the interactive platform 101 and generate pattern-level sentiments 311 for the identified patterns 305. The interaction monitoring platform 108 may identify a first pattern and a second pattern in the interaction data 104. Identified patterns may be exhibited in one or more subsets of the interaction data 104. The interaction monitoring platform 108 may also generate a pattern-level sentiment 311 corresponding to each identified pattern 305.

The interaction monitoring platform 108 may generate a first pattern-level sentiment corresponding to the first pattern and a second pattern-level sentiment corresponding to the second pattern. The first pattern-level sentiment may be based on a weighted average of known sentiments 307 corresponding to subsets of the interaction data 104 exhibiting the first pattern. The second pattern-level sentiment may be based on a weighted average of known sentiments 307 corresponding to subsets of the interaction data 104 exhibiting the second pattern.

The interaction monitoring platform 108 may also generate a binary indicator, corresponding to each subset of the interaction data 104. The binary indicator 309 indicates which identified patterns 305 are exhibited in each subset of the interaction data 104. The interaction monitoring platform 108 may generate a first binary indicator and a second binary indicator. The first binary indicator may indicate which patterns, of the first pattern and the second pattern, are exhibited in the first subset of the interaction data 104. The second binary indicator may indicate which patterns, of the first pattern and the second pattern, are exhibited in the second subset of the interaction data 104. In a non-limiting example, each bit of a binary indicator 309 may correspond to one of the identified patterns 305, and a 1 may represent the identified pattern 305 being exhibited in the subset of the interaction data 104, and a 0 may represent the identified pattern 305 not being exhibited in the subset of the interaction data 104.

At step 203, the interaction monitoring platform 108 may train a gradient boosting model using known sentiments of the users as a target variable and using the pattern-level sentiments and patterns identified in the subsets of the interaction data as input data. The interaction monitoring platform 108 may train a gradient boosting model using known sentiment 307 as a target variable and using the first binary indicator, the second binary indicator, the first pattern-level sentiment, and the second pattern-level sentiment as input data. The training of the gradient boosting model may include the generation of one or more relationships between the known sentiments 307 and the identified patterns 305, and their corresponding sentiments, exhibited in the subsets of the interaction data 104.

At step 204, the interaction monitoring platform 108 may generate, using the trained gradient boosting model, a predicted sentiment corresponding to a subset of the interaction data with unknown sentiment that exhibits one or more of the identified patterns. The interaction monitoring platform 108 may generate a predicted sentiment corresponding to a third subset of the interaction data 104 exhibiting one or more of the first pattern or the second pattern. A sentiment may be predicted based on the one or more relationships between the identified patterns 305, binary indicators 309, pattern-level sentiments 311, and known sentiments 307.

FIG. 3 is a flow chart illustrating how an interaction monitoring platform 108 may predict a user sentiment based on a pattern-level sentiment according to some embodiments disclosed herein.

An interaction monitoring platform 108 may use interaction data 104 and response data 106 in the process of generating a predicted sentiment 319. Known sentiments 307 may be generated from response data 106. According to a non-limiting example, each known sentiment 307 may correspond to a subset of the interaction data 104, which may be associated with a user of the interactive platform 101.

The interaction monitoring platform 108 may identify one or more patterns 305 in the interaction data 104. According to some embodiments, patterns 305 may be identified based on the subsets of interaction data 104 corresponding to users of the interactive platform 101. Each identified pattern may be exhibited in one or more subsets of the interaction data 104. Each subset of the interaction data 104 may exhibit zero or more identified patterns 305. A subset of the interaction data 104 associated with a user may not necessarily exhibit all identified patterns 305. Identified patterns may be sensitive to timing or sequence of interaction data 104. As a non-limiting example, subsets of interaction data 104 may include the same user interactions performed in a different sequence and the different sequences may correspond to unique identified patterns 305.

The interaction monitoring platform 108 may generate binary indicators 309 based on the identified patterns 305 in the interaction data 104. A binary indicator 309 may be associated with a subset of the interaction data 104 and may indicate which of the identified patterns 305 are exhibited in the subset of the interaction data 104. According to some embodiments, the binary indicators 309 may include a set of bits, and each bit may be associated with a pattern 305 identified in the interaction data 104. A binary indicator 309 may indicate any number of identified patterns 305, including zero. In a non-limiting example, a '1' in a first bit position associated with a first identified pattern may indicate that the first identified pattern is exhibited in the subset of interaction data 104 associated with the binary indicator 309. Likewise, a '0' in a second bit position associated with a second identified pattern may indicate that the second identified pattern is not exhibited by the subset of interaction data 104 associated with the binary indicator 309. A binary indicator 309 may be associated with a user of the interactive platform 101 and may indicate each of the identified patterns 305 that are exhibited by that user's interaction data 104. Some binary indicators 309 may be associated with a known sentiment 307. The binary indicators 309 may represent a set of relationships between the identified patterns 305 and the known sentiments 307.

The interaction monitoring platform 108 may generate a pattern-level sentiment 311 for each identified pattern 305. A pattern-level sentiment 311 may represent a sentiment corresponding to an identified pattern 305. The pattern-level sentiments 311 may be generated based on the known sentiments 307. According to some embodiments, a pattern-level sentiment 311 of an identified pattern 305 may be generated based on a weighted average of known sentiments 307 corresponding to subsets of the interaction data 104 that exhibit the identified pattern 305. The weights applied to each subset of the interaction data 104 that exhibits the identified pattern 305 may be equal or unequal. According to some embodiments, a pattern-level sentiment 311 of an identified pattern 305 may be generated based on a median, mode, maximum, or minimum of the known sentiments 307 corresponding to subsets of the interaction data 104 that exhibit the identified pattern 305. A skilled person would understand that many different methods may be used to determine the pattern-level sentiments 311 based on known sentiments 307.

The interaction monitoring platform 108 may train 313 a machine learning model using the known sentiments 307, pattern-level sentiments 311, and the binary indicators 309. According to some embodiments, the machine learning model may be a gradient boosting model. Training 313 a gradient boosting model may include defining a loss function that describes the difference between known sentiments 307 and predicted sentiments generated based on binary indicators 309 and pattern-level sentiments 311. Although the identified patterns 305 in the interaction data 104 may include time series data, or patterns that include a time dimension, the binary indicators 309 operate to convert the identified patterns 305 into a representation suitable for performing gradient boosting.

After a machine learning model is trained, the trained model 315 may be used to make sentiment predictions based on subsets of the interaction data 104 with unknown sentiments 317, or interaction data 104 corresponding to users of the interactive platform 101 who have not provided response data 106. The interaction monitoring platform 108 may generate binary indicators 309 for interaction data 104 subsets with unknown sentiment 317. The binary indicators 309 may identify which identified patterns 305 are exhibited by the subsets with unknown sentiment 317. The trained model 315 may include learned relationships between identified patterns 305 and known sentiments 307. Using these learned relationships, the trained model 315 may generate a predicted sentiment 319 based on the binary indicators 309 corresponding to subsets with unknown sentiment 317.

Figure 4:
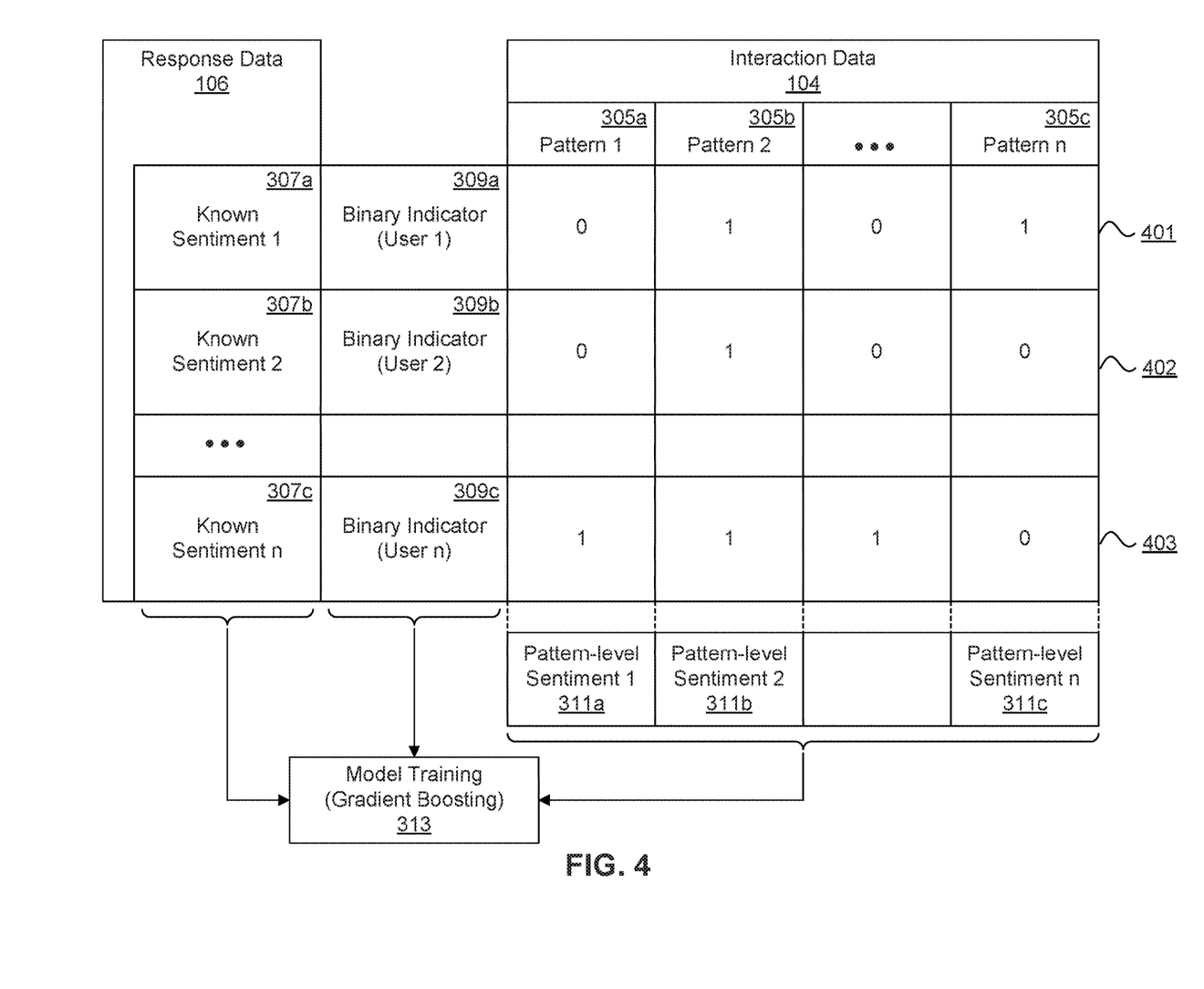
FIG. 4 is a flow chart illustrating how an interaction monitoring platform may predict a user sentiment based on known sentiments, identified patterns, pattern-level sentiment and a gradient boosting model according to some embodiments disclosed herein.

FIG. 4 is a chart illustrating how an interaction monitoring platform 108 may predict a user sentiment based on known sentiments 307, identified patterns 305, pattern-level sentiment 311 and a gradient boosting model according to some embodiments disclosed herein.

Interaction data 104 data may include subsets of interaction data 104 associated with individual users. As a non-limiting example, three subsets of the interaction data 104 are shown in the rows 401, 402, 403 in FIG. 4 These rows represent subsets of the interaction data 104 associated with "User 1", "User 2", and "User n".

The interaction monitoring platform 108 may analyze the interaction data 104 to identify patterns 305. The interaction monitoring platform 108 may identify patterns 305 within each subset 401, 402, 403 of the interaction data 104. As a non-limiting example, "Pattern 1" 305a and "Pattern 2" 305b through "Pattern n" are represented by the columns in FIG. 4.

Some users may provide response data 106, which the interaction monitoring platform 108 may use to determine known sentiments 307a, 307b, 307c. Each subset 401, 402, 403 illustrated in FIG. 4 is associated with a user's known sentiment 307a, 307b, 307c, generated from the response data 106, and a binary indicator 309a, 309b, 309c. The binary indicators 309a, 309b, and 309c identify which identified patterns 305 are exhibited by each user's subset of the interaction data 104. The first binary indicator 309a, which is associated with User 1, indicates that Pattern 2 305b, and Pattern n 305c were found in the subset of interaction data 104 associated with User 1. Likewise, User 2's binary indicator 309b shows that Pattern 2 was found in User 2's subset of the interaction data 104, and User n's binary indicator 309c shows that Pattern 1 305a and Pattern 2 305b were found in User n's subset of the interaction data 104.

The binary indicators 309 may also be used in generating the pattern-level sentiments 311. The pattern-level sentiments 311 may be generated based on a composite of known sentiments 307 that are associated with subsets of the interaction data 104 that exhibit the identified patterns 305. As a non-limiting example illustrated in FIG. 4, Pattern 1 305a was identified in the subset of interaction data 104 associated with User n and "Pattern-level sentiment 1" 311a, associated with Pattern 1, may be generated based on the known sentiment n 307c. Pattern 2 was identified in subsets 401, 402, and 403 associated with User 1, User 2, and User n. Pattern-level sentiment 2 311b may be generated based on known sentiment 1 307a, known sentiment 2 307b, and known sentiment n 307c. According to some embodiments, the pattern-level sentiments 311a, 311b, 311c may be generated based on a weighted average of the known sentiments 307a, 307b, 307c associated with the subsets of the interaction data 104 that exhibit the identified patterns 305a, 305b, 305c.

Model training 313 may be performed using the binary indicators 309, their associated known sentiments 307, and the pattern-level sentiments 311. According to some embodiments, the patterns are not directly used in the model training 313. According to some embodiments, the relationship between identified patterns 305 and user sentiments associated with those identified patterns 305 may be captured in the binary indicators 309 associated with users of the interactive platform 101 and the known sentiments 307 of those users.

Figure 5:
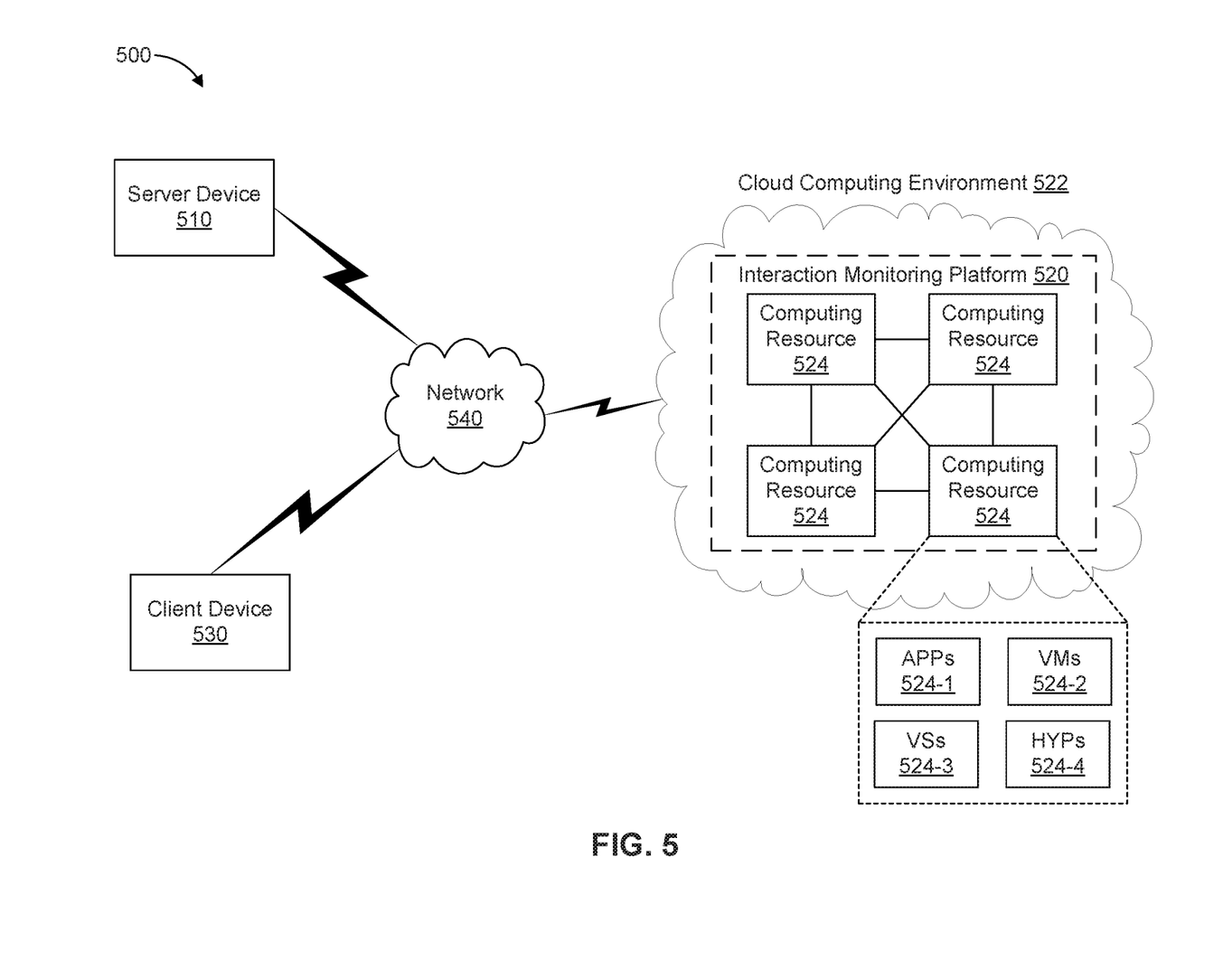
FIG. 5 is a diagram of a non-limiting example environment in which systems or methods described herein may be implemented.

FIG. 5 is a diagram of a non-limiting example environment in which systems or methods described herein may be implemented.

As shown in FIG. 5, an environment 500 may include a server device 510, an interaction monitoring platform 520, a client device 530, and/or the like. Devices of environment 500 may interconnect via wired connections, wireless connections, or a combination of wired and wireless connections.

Server device 510 includes one or more devices capable of receiving, generating, storing, processing, or providing information associated with user interactions. For example, server device 510 may include a server device (e.g., a host server, a web server, an application server, etc.), a data center device, or a similar device. In some implementations, server device 510 may be capable of communicating with client device 530 and/or interaction monitoring platform 520, in a manner designed to facilitate collection of interaction data 104 and/or response data 106. For example, server device 510 may receive, obtain and/or capture interaction data 104 and/or response data 106, may collect interaction data 104 and/or response data 106 for a historical period of time or in real time, and/or may send the interaction data 104 and/or response data 106 to interaction monitoring platform 520. Server device 510 may obtain current user interaction information in real-time and/or send the current user interaction information to interaction monitoring platform 520 in real-time.

Interaction monitoring platform 520 includes one or more devices that receive and/or process information (e.g., historical interaction data 104 and/or historical response data 106, current user interaction data 104, one or more touchpoints, and/or the like), generate information (e.g., a user sentiment, user interaction score of a user interaction, an association between the user interaction score and a touchpoint set, a ranking of one or more touchpoint sets of the user interaction, and/or the like), determine information (e.g. a user interaction score of a user interaction, an association between the user interaction score and a touchpoint set, a ranking of one or more touchpoint sets of the user interaction, user sentiment, and/or the like) and/or generate an alert indicating that action needs to be taken. Interaction monitoring platform 520 may perform, or cause to be performed, at least one action.

In some implementations, interaction monitoring platform 520 can be designed to be modular such that certain software components can be swapped in or out depending on a particular need. As such, interaction monitoring platform 520 can be easily and/or quickly reconfigured for different uses. In some implementations, interaction monitoring platform 520 can receive information from and/or transmit information to server device 510, client device 530, and/or the like.

In some implementations, as shown, interaction monitoring platform 520 can be hosted in a cloud computing environment 522. Notably, while implementations described herein describe interaction monitoring platform 520 as being hosted in cloud computing environment 522, in some implementations, interaction monitoring platform 520 may be implemented outside of a cloud computing environment or may be partially cloud-based.

Cloud computing environment 522 includes an environment that hosts interaction monitoring platform 520. Cloud computing environment 522 can provide computation, software, data access, storage, etc. services that do not require end-user knowledge of a physical location and configuration of system(s) and/or device(s) that host interaction monitoring platform 520. As shown, cloud computing environment 522 can include a group of computing resources 524 (referred to collectively as "computing resources 524" and individually as "computing resource 524").

Computing resource 524 may include one or more personal computers, workstation computers, server devices, or other types of computation and/or communication devices. In some implementations, computing resource 524 can host interaction monitoring platform 520. The cloud resources can include compute instances executing in computing resource 524, storage devices provided in computing resource 524, data transfer devices provided by computing resource 524, etc. In some implementations, computing resource 524 can communicate with other computing resources 524 via wired connections, wireless connections, or a combination of wired and wireless connections.

As further shown in FIG. 5, computing resource 524 may include a group of cloud resources, such as one or more applications ("APPs") 524-1, one or more virtual machines ("VMs") 524-2, virtualized storage ("VSs") 524-3, one or more hypervisors ("HYPs") 524-4, and/or the like.

Application 524-1 may include one or more software applications that can be provided to or accessed by client device 530. Application 524-1 can eliminate a need to install and execute the software applications on client device 530. For example, application 524-1 can include software associated with interaction monitoring platform 520 and/or any other software capable of being provided via cloud computing environment 522. In some implementations, one application 524-1 can send/receive information to/from one or more other applications 524-1, via virtual machine 524-2.

Virtual machine 524-2 includes a software implementation of a machine (e.g., a computer) that executes programs like a physical machine. Virtual machine 524-2 can be either a system virtual machine or a process virtual machine, depending upon use and degree of correspondence to any real machine by virtual machine 524-2. A system virtual machine can provide a complete system platform that supports execution of a complete operating system ("OS"). A process virtual machine can execute a single program, and can support a single process. In some implementations, virtual machine 524-2 can execute on behalf of a user (e.g., client device 530 or an operator of interaction monitoring platform 520), and can manage infrastructure of cloud computing environment 522, such as data management, synchronization, or long-duration data transfers.

Virtualized storage 524-3 includes one or more storage systems and/or one or more devices that use virtualization techniques within the storage systems or devices of computing resource 524. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 524-4 can provide hardware virtualization techniques that allow multiple operating systems (e.g., "guest operating systems") to execute concurrently on a host computer, such as computing resource 524. Hypervisor 524-4 can present a virtual operating platform to the guest operating systems, and can manage the execution of the guest operating systems. Multiple instances of a variety of operating systems can share virtualized hardware resources.

Client device 530 includes one or more devices capable of receiving, generating, storing, processing, and/or providing information associated with user interaction. For example, client device 530 can include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. Client device 530 may receive and/or obtain an alert from interaction monitoring platform 520. Client device may display the alert and/or perform, or cause to be performed, at least one action based on the alert.

Network 540 includes one or more wired and/or wireless networks. For example, network 540 can include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 5 is provided as a non-limiting example. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of environment 500 may perform one or more functions described as being performed by another set of devices of environment 500.

Figure 6:
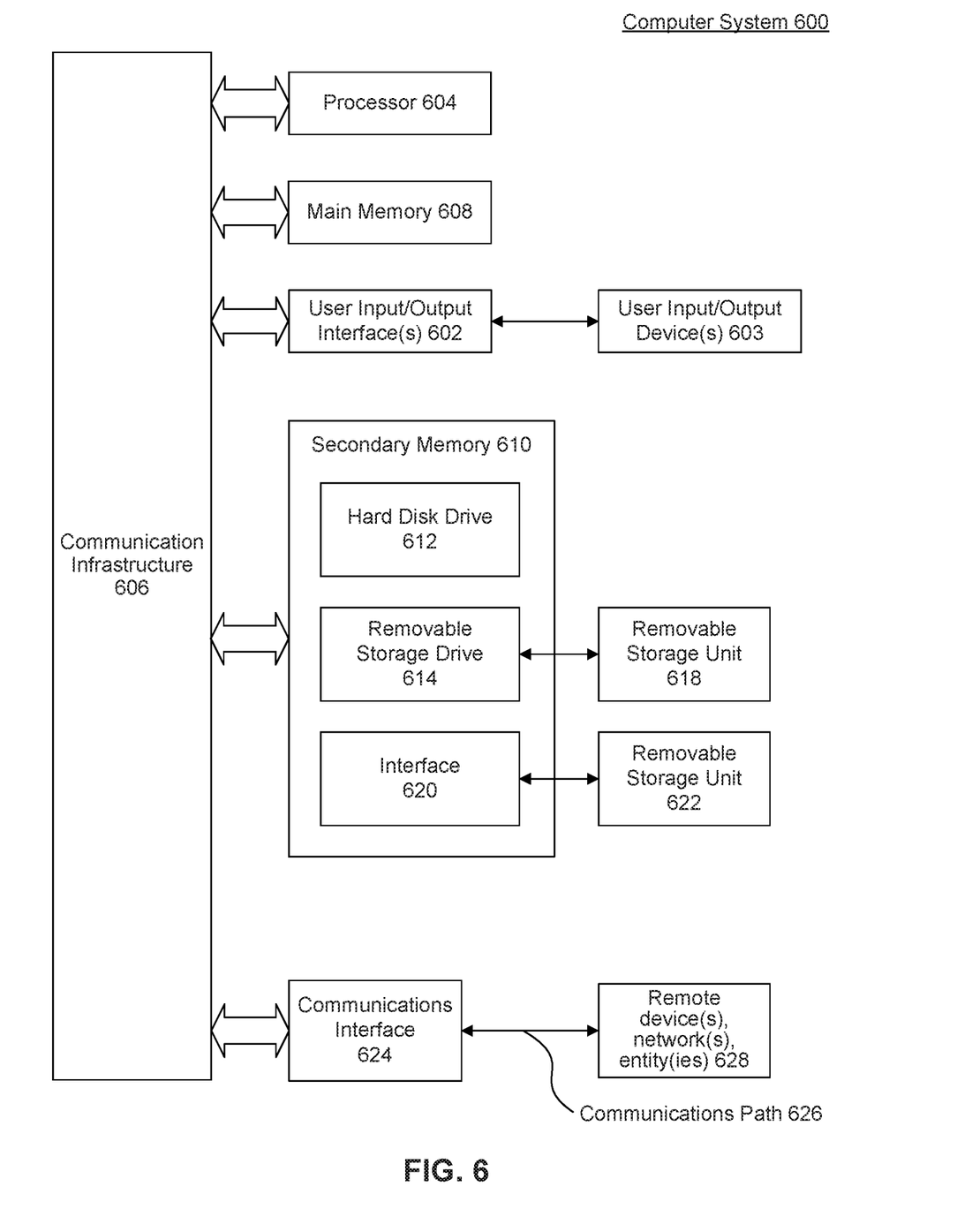
FIG. 6 is a block diagram of a non-limiting example computer system useful for implementing various embodiments disclosed herein.

FIG. 6 is a block diagram of a non-limiting example computer system useful for implementing various embodiments disclosed herein. Various embodiments may be implemented, for example, using one or more well-known computer systems, such as computer system 600 shown in FIG. 6. One or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include user input/output device(s) 603, such as monitors, keyboards, pointing devices, etc., which may communicate with communication infrastructure 606 through user input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache and/or registers. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communications interface 624 may enable computer system 600 to communicate and interact with any combination of external devices, external networks, external entities, etc. (individually and collectively referenced by reference number 628). For example, communications interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A method of predicting user sentiment from pattern-level sentiment, the method comprising:
    identifying a first pattern and a second pattern in interaction data of an interactive platform, the first pattern corresponding to a first pattern-level sentiment generated based on a first known sentiment corresponding to response data and a subset of the interaction data exhibiting the first pattern, and the second pattern corresponding to a second pattern-level sentiment generated based on a second known sentiment corresponding to the response data and a subset of the interaction data exhibiting the second pattern, wherein the response data include one or more user responses concerning one or more user interactions included in the interaction data, and wherein the interaction data concern the one or more user interactions between one or more users and the interactive platform, and a user interaction includes a website interaction, a mobile application interaction, or a transaction card terminal interaction;
    generating a first binary indicator, wherein the first binary indicator indicates whether the first pattern and the second pattern are exhibited in a first subset of the interaction data;
    generating a second binary indicator, wherein the second binary indicator indicates whether the first pattern and the second pattern are exhibited in a second subset of the interaction data;
    training a gradient boosting model using known sentiment as a target variable and using the first binary indicator, the second binary indicator, the first pattern-level sentiment, and the second pattern-level sentiment as input data;
    generating, using the trained gradient boosting model, a predicted sentiment corresponding to a third subset of the interaction data exhibiting one or more of the first pattern or the second pattern.

2. The method of claim 1, wherein the first subset of the interaction data corresponds to a first user's interactions with the interactive platform, the second subset of the interaction data corresponds to a second user's interactions with the interactive platform, and the third subset of the interaction data corresponds to a third user's interactions with the interactive platform.

3. The method of claim 1, further comprising:
    generating the first pattern-level sentiment based on the first known sentiment corresponding to the subset of the interaction data exhibiting the first pattern;
    generating the second pattern-level sentiment based on the second known sentiment corresponding to the subset of the interaction data exhibiting the second pattern.

4. The method of claim 3, wherein the known sentiment, used as the target variable, comprises the first known sentiment and the second known sentiment.

5. The method of claim 3, further comprising:
    collecting the interaction data from users of the interactive platform;
    gathering the response data from one or more of the users;
    generating the first known sentiment and the second known sentiment based on the gathered response data.

6. The method of claim 3, wherein the first known sentiment and the second known sentiment each comprises a binary value corresponding to a promotor sentiment or a detractor sentiment; and
    wherein the predicted sentiment comprises a value in a range between a lower bound and an upper bound.

7. The method of claim 1, wherein the generating of the first pattern-level sentiment comprises generating a pattern-level sentiment based on a weighted average of known sentiments corresponding to subsets of the interaction data exhibiting the first pattern; and
    wherein the generating of the second pattern-level sentiment comprises generating a pattern-level sentiment based on a weighted average of known sentiments corresponding to subsets of interaction data exhibiting the second pattern.

8. A system comprising:
    one or more processors and memory configured to:
    identify a first pattern and a second pattern in interaction data of an interactive platform, the first pattern corresponding to a first pattern-level sentiment generated based on a first known sentiment corresponding to response data and a subset of the interaction data exhibiting the first pattern, and the second pattern corresponding to a second pattern-level sentiment generated based on a second known sentiment corresponding to the response data and a subset of the interaction data exhibiting the second pattern, wherein the response data include one or more user responses concerning one or more user interactions included in the interaction data, and wherein the interaction data concern the one or more user interactions between one or more users and the interactive platform, and a user interaction includes a website interaction, a mobile application interaction, or a transaction card terminal interaction;
    generate a first binary indicator, wherein the first binary indicator indicates whether the first pattern and/or the second pattern is exhibited in a first subset of the interaction data;
    generate a second binary indicator, wherein the second binary indicator indicates whether the first pattern and/or the second pattern is exhibited in a second subset of the interaction data;
    train a gradient boosting model using known sentiment as a target variable and using the first binary indicator, the second binary indicator, the first pattern-level sentiment, and the second pattern-level sentiment as input data;
    generate, using the trained gradient boosting model, a predicted sentiment corresponding to a third subset of the interaction data exhibiting one or more of the first pattern or the second pattern.

9. The system of claim 8, wherein the first subset of the interaction data corresponds to a first user's interactions with the interactive platform, the second subset of the interaction data corresponds to a second user's interactions with the interactive platform, and the third subset of the interaction data corresponds to a third user's interactions with the interactive platform.

10. The system of claim 8, wherein the one or more processors and memory are further configured to:
generate the first pattern-level sentiment based on the first known sentiment corresponding to the subset of the interaction data exhibiting the first pattern;
generate the second pattern-level sentiment based on the second known sentiment corresponding to the subset of the interaction data exhibiting the second pattern.

11. The system of claim 10, wherein the known sentiment, used as the target variable, comprises the first known sentiment and the second known sentiment.

12. The system of claim 10, wherein the one or more processors and memory are further configured to:
collect the interaction data from users of the interactive platform;
gather the response data from one or more of the users; and
generate the first known sentiment and the second known sentiment based on the gathered response data.

13. The system of claim 10, wherein the first known sentiment and the second known sentiment each comprises a binary value corresponding to a promotor sentiment or a detractor sentiment; and
wherein the predicted sentiment comprises a value in a range between a lower bound and an upper bound.

14. The system of claim 8, wherein the generating of the first pattern-level sentiment comprises generating a pattern-level sentiment based on a weighted average of known sentiments corresponding to subsets of the interaction data exhibiting the first pattern; and
wherein the generating of the second pattern-level sentiment comprises generating a pattern-level sentiment based on a weighted average of known sentiments corresponding to subsets of interaction data exhibiting the second pattern.

15. A non-transitory computer readable device storing instructions that, when executed by a processor cause the processor to perform method steps comprising:
identifying a first pattern and a second pattern in interaction data of an interactive platform, the first pattern corresponding to a first pattern-level sentiment generated based on a first known sentiment corresponding to response data and a subset of the interaction data exhibiting the first pattern, and the second pattern corresponding to a second pattern-level sentiment generated based on a second known sentiment corresponding to the response data and a subset of the interaction data exhibiting the second pattern, wherein the response data include one or more user responses concerning one or more user interactions included in the interaction data, and wherein the interaction data concern the one or more user interactions between one or more users and the interactive platform, and a user interaction includes a website interaction, a mobile application interaction, or a transaction card terminal interaction;
generating a first binary indicator, wherein the first binary indicator indicates whether the first pattern and/or the second pattern is exhibited in a first subset of the interaction data;
generating a second binary indicator, wherein the second binary indicator indicates whether the first pattern and/or the second pattern is exhibited in a second subset of the interaction data;
training a gradient boosting model using known sentiment as a target variable and using the first binary indicator, the second binary indicator, the first pattern-level sentiment, and the second pattern-level sentiment as input data;
generating, using the trained gradient boosting model, a predicted sentiment corresponding to a third subset of the interaction data exhibiting one or more of the first pattern or the second pattern.

16. The non-transitory computer readable device of claim 15 storing instructions that, when executed by a processor, cause the processor to further perform the method steps of:
generating the first pattern-level sentiment based on the first known sentiment corresponding to the subset of the interaction data exhibiting the first pattern;
generating the second pattern-level sentiment based on the second known sentiment corresponding to the subset of the interaction data exhibiting the second pattern.

17. The non-transitory computer readable device of claim 16, wherein the known sentiment, used as the target variable, comprises the first known sentiment and the second known sentiment.

18. The non-transitory computer readable device of claim 16, storing instructions that, when executed by a processor, cause the processor to further perform the method steps of:
collecting the interaction data from users of the interactive platform;
gathering the response data from one or more of the users;
generating the first known sentiment and the second known sentiment based on the gathered response data.

19. The non-transitory computer readable device of claim 16, wherein the first known sentiment and the second known sentiment each comprises a binary value corresponding to a promotor sentiment or a detractor sentiment; and
wherein the predicted sentiment comprises a value in a range between a lower bound and an upper bound.

20. The non-transitory computer readable device of claim 16, wherein the generating of the first pattern-level sentiment comprises generating a pattern-level sentiment based on a weighted average of known sentiments corresponding to subsets of the interaction data exhibiting the first pattern; and
wherein the generating of the second pattern-level sentiment comprises generating a pattern-level sentiment based on a weighted average of known sentiments corresponding to subsets of interaction data exhibiting the second pattern.

* * * * *